(12) United States Patent
Martin

(10) Patent No.: US 10,724,950 B2
(45) Date of Patent: Jul. 28, 2020

(54) ANALYSIS METHOD FOR INTERPRETING TAYLOR DISPERSION DATA

(71) Applicant: SARTORIUS BIOANALYTICAL INSTRUMENTS, INC., Bohemia, NY (US)

(72) Inventor: Aaron David Martin, Oklahoma City, OK (US)

(73) Assignee: SARTORIUS BIOANALYTICAL INSTRUMENTS, INC., Bohemia, NY (US)

( * ) Notice: Subject to any disclaimer, the term of this patent is extended or adjusted under 35 U.S.C. 154(b) by 211 days.

(21) Appl. No.: 15/761,750

(22) PCT Filed: Sep. 27, 2016

(86) PCT No.: PCT/US2016/053936
§ 371 (c)(1),
(2) Date: Mar. 20, 2018

(87) PCT Pub. No.: WO2017/058777
PCT Pub. Date: Apr. 6, 2017

(65) Prior Publication Data
US 2018/0266949 A1 Sep. 20, 2018

Related U.S. Application Data

(60) Provisional application No. 62/233,605, filed on Sep. 28, 2015.

(51) Int. Cl.
*G01N 21/55* (2014.01)
*G01N 21/41* (2006.01)
(Continued)

(52) U.S. Cl.
CPC ....... *G01N 21/554* (2013.01); *G01N 15/1404* (2013.01); *G01N 21/553* (2013.01);
(Continued)

(58) Field of Classification Search
CPC ........ G01N 21/55; G01N 21/41; G01N 15/14; G01N 35/10
(Continued)

(56) References Cited

U.S. PATENT DOCUMENTS

| 8,906,672 B2 | 12/2014 | Quinn |
| 2011/0264380 A1 | 10/2011 | Cottet et al. |

(Continued)

FOREIGN PATENT DOCUMENTS

| JP | 2005-535881 | 11/2005 |
| JP | 2015-521743 | 7/2015 |

OTHER PUBLICATIONS

Shank-Retzlaff, M. L. et al, Analytical Chemistry 2000, 72, 4212-4220.*
(Continued)

*Primary Examiner* — Arlen Soderquist
(74) *Attorney, Agent, or Firm* — McAfee & Taft

(57) ABSTRACT

Disclosed is a method for preparing dispersion gradients and an SPR injection method for determining full kinetics and affinity analysis in the presence of a competitor molecule. The SPR injection provides a dispersion gradient of two or more samples to a SPR flow cell and detector.

16 Claims, 10 Drawing Sheets

(51) Int. Cl.
- *G01N 15/14* (2006.01)
- *G01N 35/10* (2006.01)
- *G01N 21/552* (2014.01)
- *G01N 15/00* (2006.01)
- *G01N 21/05* (2006.01)

(52) U.S. Cl.
CPC ......... *G01N 21/05* (2013.01); *G01N 21/4133* (2013.01); *G01N 35/1095* (2013.01); *G01N 2015/0092* (2013.01); *G01N 2201/122* (2013.01); *G01N 2201/129* (2013.01)

(58) Field of Classification Search
USPC ........................................................ 436/86
See application file for complete search history.

(56) References Cited

U.S. PATENT DOCUMENTS

2013/0273564 A1    10/2013  Quinn
2018/0067901 A1*    3/2018  Latunde-Dada ....... G01N 13/00

OTHER PUBLICATIONS

Quinn, J. G., Analytical Biochemistry 2010, 421, 391-400.*
Quinn, J. G., Analytical Biochemistry 2010, 421, 401-410.*
Martin, For the First Time, Simultaneous Detection of Protein Aggregation and Affinity Measurements in a Single SPR Experiment, Technical brief, Sep. 17, 2015, pp. 2-5; figures 2-3, Sensiq Techonologies, Inc., Oklahoma City, Oklahoma US.
Sensiq Technologies, Inc., Learn how Sensiq's Dynamic Injection (DISPR) Techniques Enhance the Biophysical Characterization of Binding Events using Surface Plasmon Resonance Technology, Biophysical Society, 59th Annual Meeting, Feb. 10, 2015; p. 1.
Marty, Nonlinear Analyte Concentration Gradients for One-Step Kinetic Analysis Employing Optical Microring Resonators, Analytical Chemistry, vol. 84 No. 13, Jul. 3, 2012, abstract; pp. 1, 6, S-2.
Quinn, John G., Modeling Taylor Dispersion Injections: Determination of Kinetic/Affinity Interaction Constants and Diffusion Coefficients in Label-Free Biosensing, Analytical Biochemistry, vol. 421, No. 2, pp. 391-400 Dec. 1, 2011.
Strauch, Jelica, et al., Diffusion Coefficients of the Monomer and Oligomers in Hydroxyethyl Methacrylate, Journal of Polymer Science, Part A: Polymer Chemistry, vol. 41, No. 16, pp. 2491-2501 Aug. 15, 2003.
EP Supplementary European Search Report mailed in corresponding EP Application No. EP 16852403 dated Mar. 7, 2019, pp. 1-10.
JP Notice of Reasons for Rejection mailed in corresponding JP Application No. 2018-515802 dated May 24, 2019, pp. 1-6.
JP Final Rejection mailed in corresponding JP Application No. 2018-515802 dated Jan. 21, 2020, pp. 1-4.

* cited by examiner

ANALYSIS METHOD FOR INTERPRETING TAYLOR DISPERSION DATA

CROSS REFERENCE TO RELATED APPLICATION

This application claims the benefit of U.S. Provisional Application No. 62/233,605 filed Sep. 28, 2015.

BACKGROUND

Understanding when and to what degree large biomolecules form aggregates of two or more molecules is important to the development of medical treatments and a general understanding of the molecule. Current techniques for estimating aggregate formation and percent aggregate in a heterogeneous solution require multiple steps. One method uses an approximation of diffusion coefficients to determine the percent aggregate in solution. As depicted in FIG. 3, the change in diffusion coefficient can be used generate a calibration curve suitable for estimating the percent aggregate in a heterogeneous solution. The slope of FIG. 3 was prepared using dextran solutions having varying degrees of known aggregate percentages.

Unfortunately, many biomolecules such as, but not limited to, proteins, DNA, peptides and hormones, do not permit the easy preparation of known aggregate standards for use in a calibration table as depicted in FIG. 3. Therefore, calibration free methods for determining the presence and percentage of aggregate forms of such compounds would be useful to those studying biomolecules.

SUMMARY

Disclosed herein is a method for qualitatively determining the presence of an aggregate in a heterogeneous mixture of monomer and aggregate. Also disclosed is a method for quantitatively determining the percentage of aggregate in a heterogeneous mixture of monomer and aggregate. Further disclosed is a method for estimating the number of monomers making up an aggregate component in heterogeneous mixture of monomer and aggregate.

The method of the present invention may be carried out using either a pulse type or sigmoidal type injection to produce a Taylor dispersion for use in Surface Plasmon Resonance (or SPR) analysis.

Disclosed herein is a method for determining the presence of an aggregate form of a monomer in a heterogeneous solution. The method includes the steps of:

identifying at least one monomer within said solution and determining the $D_m$ for said monomer;

determine the total analyte concentration ($C_{tot}$) within said solution, said total analyte concentration including both the monomer concentration ($C_m$) and any aggregate concentration ($C_a$) present in said solution;

performing SPR analysis on a sample of said solution containing said monomer and aggregate by injecting said sample under Taylor Dispersion conditions using a pulse injection technique;

determining the SPR bulk refractive index response curve under Taylor Dispersion conditions;

using a least squares fitting technique, fit Equation #1a to the SPR bulk refractive index response curve for said sample:

$$Y = \frac{2 * C_m * dndc * Vi}{\pi^{3/2} * d^2 * \sqrt{k_m * t}} * e^{-\frac{0.25 * L^2 * \left(1 - \frac{t}{\tau}\right)^2}{k_m * t}} + \quad \text{(Equation \#1a)}$$

$$\frac{2 * C_a * dndc * Vi}{\pi^{3/2} * d^2 * \sqrt{k_a * t}} * e^{-\frac{0.25 * L^2 * \left(1 - \frac{t}{\tau}\right)^2}{k_a * t}}$$

where
$C_m$=monomer concentration
$C_a$=aggregate concentration
$C_{tot}$=total protein concentration (monomer plus aggregate)

$$C_m = C_{tot} - C_a \quad \text{(Equation \#1b)}$$

dndc=RII of the analyte (typically mL/mg*RU)
$V_i$=sample injection volume (m³)
d=tubing diameter (m)
τ=mean analyte residence time=L/u (s)
L=length of tube (m)
u=average velocity of fluid (m/s)
$k_m$=Taylor-Aris dispersion coefficient of the monomer species (m²/s)

$$k_m = \frac{u^2 * d^2}{192 * D_m} + D_m \quad \text{(Equation \#1c)}$$

$k_a$=Taylor-Aris dispersion coefficient of the aggregate species (m²/s)

$$k_a = \frac{u^2 * d^2}{192 * D_a} + D_a \quad \text{(Equation \#1d)}$$

$D_m$=analyte diffusion coefficient of monomer species (m2/s)
$D_a$=analyte diffusion coefficient of aggregate species (m2/s)

after fitting Equation #1a to the bulk refractive index response curve, thereby providing an approximate $C_a$, solving for $D_a$, wherein when $D_a$ does not equal $D_m$, provides a positive determination of the presence of an aggregate form of the monomer in said heterogeneous solution.

The method described above may also be practiced using a sigmoidal injection under Taylor dispersion conditions. When using a sigmoidal injection, Equation 2a is substituted for Equation 1a. Equation 2a is:

$$Y = \frac{C_m * dndc}{2} * \left[1 - \text{erf} \frac{1 - \frac{t}{\tau}}{2\sqrt{\frac{k_m}{uL} * \frac{t}{\tau}}}\right] + \frac{C_a * dndc}{2} * \left[1 - \text{erf} \frac{1 - \frac{t}{\tau}}{2\sqrt{\frac{k_a}{uL} * \frac{t}{\tau}}}\right].$$

where
erf=Gauss error function.

DETAILED DESCRIPTION

SPR techniques are well known to those skilled in the art and will not be discussed in detail herein. The following disclosure will focus on the methods for assessing the presence, concentration and estimated characterization of an aggregate in a heterogeneous mixture of monomer and aggregate.

Dispersion gradient may be analyzed using flow-injection based sensing systems. For the purposes of this disclosure, the analysis of the dispersion gradients will be described in terms of Surface Plasmon Resonance (SPR). In flow-injection based sensing systems, typically used for biomolecular interaction analysis applications, a sample containing at least one analyte flows across a surface sensitive detector through flow injection. In this instance, the sample flows through a SPR cell housing the SPR sensing surface.

Figure 1:
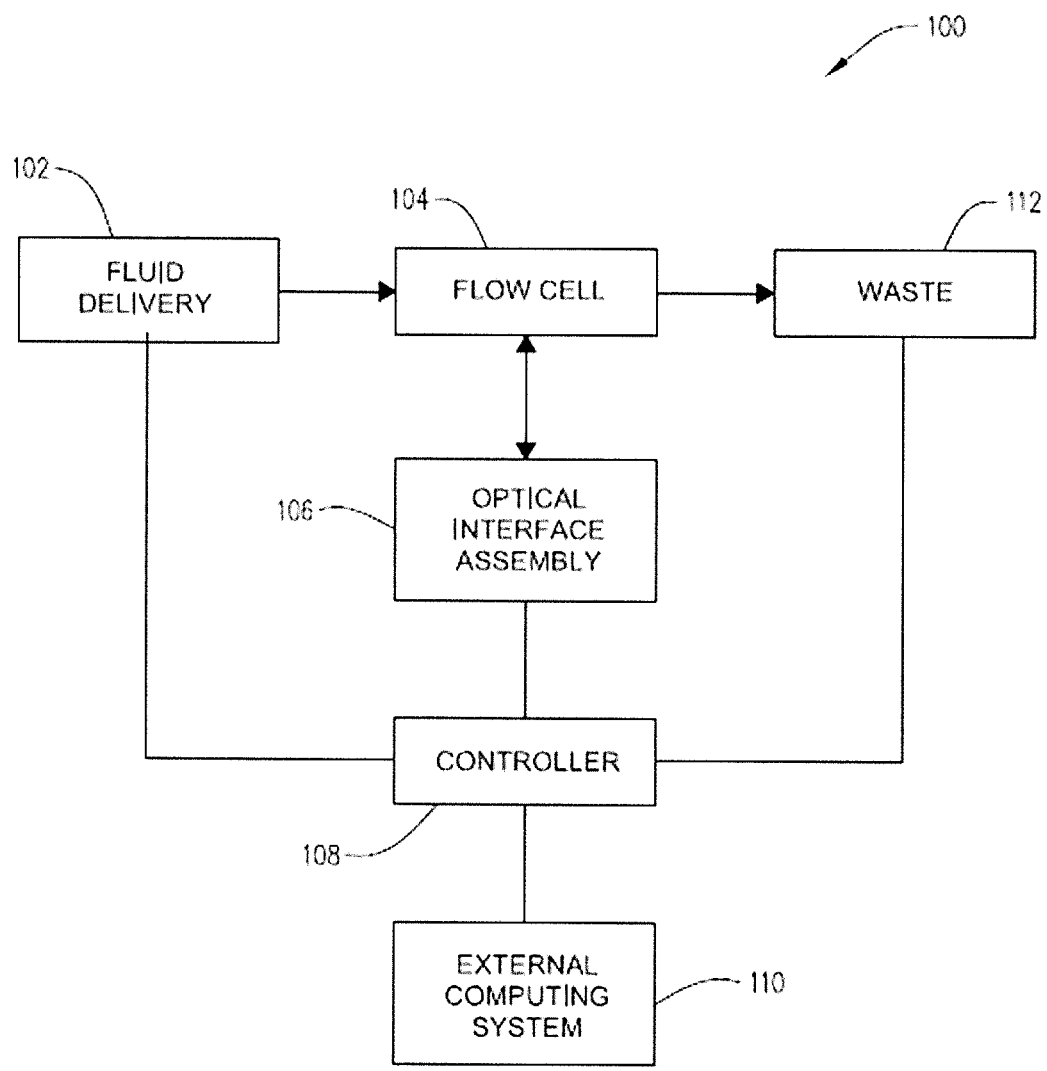
FIG. 1 is a diagram of an SPR test system, which can use the fluid delivery system of some embodiments.

An SPR testing system suitable for practicing the methods disclosed herein will be described briefly with reference to FIGS. 1 and 2. In FIG. 1, an SPR system 100 is illustrated. SPR system 100 includes a flow injection system or fluid delivery system 102 having a complex of flow channels, valves, pumps and/or other components configured to provide a substantially constant flow of fluid from a plurality of fluid sources to a flow cell 104. According to one embodiment, the flow cell 104 may be operatively coupled to an optical interface assembly 106, which is configured to carry out an SPR measurement. SPR optical interface assemblies are known in the art and may include a thin-film optical substrate, prism, illuminator and detector.

Typically, the flow cell may be configured to maintain an electro-optical relationship between the SPR coupling surface and a plurality of active sensing regions (not shown).

An optical interface assembly 106 is operable to illuminate the thin-film optical substrate and detect variations in the amount of reflected light energy. The amount of reflected light energy is, in turn, affected by binding (or not) of a molecule or biomolecule from an analyte onto the active sensing regions. In the case where there is no binding of the analyte to the active sensing regions, the biomolecules still affect the amount of reflected light energy when sufficient concentration is present to change the dielectric properties at the sensing region surface. When performing analysis of non-binding analyte, the active SPR regions will typically be coated with a compound selected for its ability to prevent non-specific binding of the analyte. One example of a suitable coating material is carboxymethyl-dextran.

As discussed above, the optical interface assembly 106 typically includes an illuminator configured to illuminate the thin-film optical substrate. The illuminator may include a number of discrete and/or integrated components operative to produce the illumination. Typically, a prism is aligned to receive light from the illuminator and couple it to the thin-film optical substrate. A portion of the photons of light may be converted to surface plasmons. In some SPR systems, the remaining photons are reflected from the thin-film optical substrate, and the prism is configured to couple them out to a detector. The detector is operable to detect variations in the proportion of photons reflected from across the surface of the thin-film optical substrate. Other SPR systems detect a shift in the emission angle of the plasmons by tracking the SPR dip minimum.

A controller 108 may be operatively coupled to the fluid delivery system 102 and optical interface assembly 106, and may include an interface to an external computing system or network 110. Alternatively, the interface to the external computing system or network 110 may be omitted and the apparatus 100 may operate as a stand-alone system. Controller 108 may be used to control the output of the illuminator, perform image processing on the image acquired by the detector, perform data analysis or transmit image data to an external processor 110 for image processing, transmit and receive status and command data to and from internal components and external systems, provide a human interface via a keyboard, display, and/or other status indicators (not shown), and control the fluid delivery system 102. In particular, the fluid delivery system may include pumps and valves with electrical control interfaces, and the controller 108 may transmit signals to operate the pumps, valves, etc. of the fluid delivery system 102. As necessary, the controller 108 may be operatively coupled to waste system 112.

Figure 2:
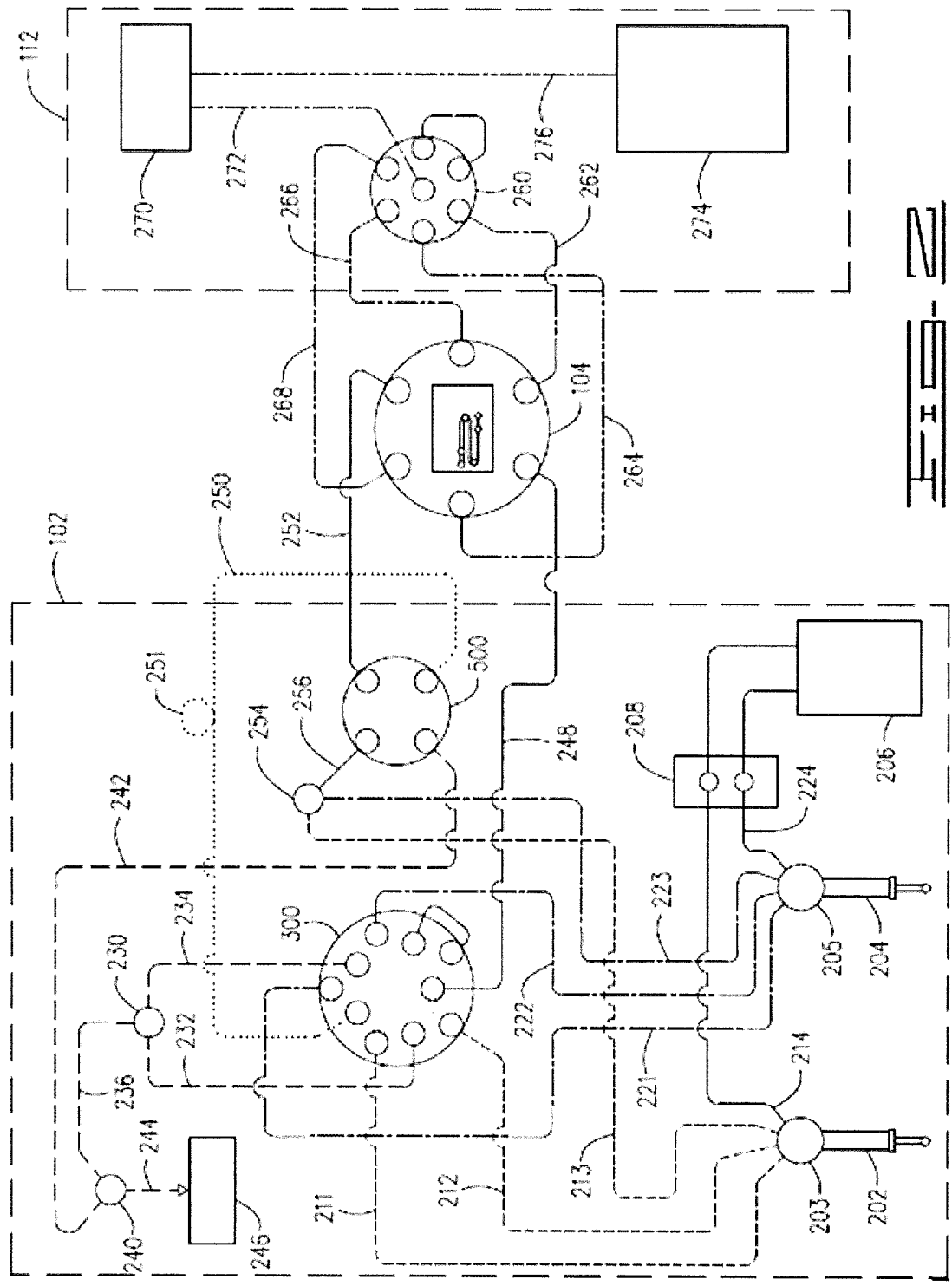
FIG. 2 schematically depicts one configuration of a system suitable for practicing the methods disclosed herein.
Figure 3:
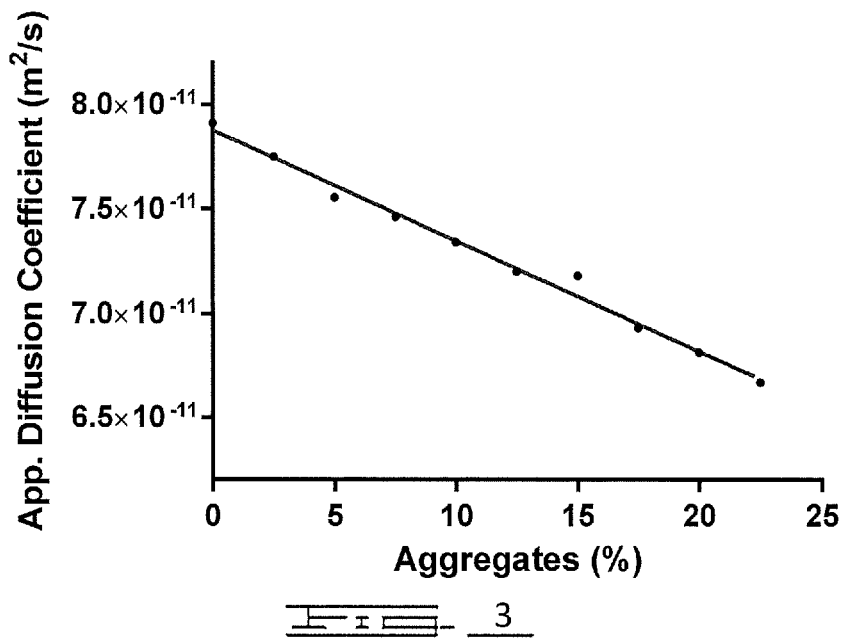
FIG. 3 is a calibration table for determining the percent aggregation of dextran.

The system of FIG. 2 is a schematic diagram of a fluid delivery system 102, a flow cell 104 and waste system 112 according to some embodiments. The fluid delivery system 102 includes a first pump 202, and a second pump 204 configured to pump fluids through the flow cell 104 via first multi-port valve 300 and second multi-port valve 500. The first and second pumps 202, 204 may each be a pump such as a syringe pump, such as the Cavro XLP6000 syringe pump or Cavro Centris syringe pump marketed by Tecan. Each pump 202, 204 has a distribution valve 203, 205 so as to be configured to pump to or from one of four flow lines. Generally, the distribution valve 203 can be set for first pump 202 to pump buffer solution into the pump's syringe from buffer storage 206 through flow line 214 and out through one of flow lines 211, 212 and 213. Accordingly, distribution valve 203 is configured such that one port of first multi-port valve 300 or second multi-port valve 500 receives fluid from pump 202 at any time. The buffer solution from buffer storage 206 can pass through a degasser 208 prior to being introduced into first pump 202.

Similarly, distribution valve 205 typical can be set for second pump 204 to pump buffer solution into the pump's syringe from buffer storage 206 through flow line 224 and out through one of flow lines 221, 222, 223. Accordingly, distribution valve 205 is configured such that one port of first multi-port valve 300 or second multi-port valve 500 receives fluid from pump 204 at any time. Again, buffer solution from buffer storage 206 can pass through a degasser 208 prior to being introduced into second pump 204. Any suitable distribution valve can be utilized for distribution valve 203, 205.

Flow lines 211 and 212 connect first pump 202 in fluid flow communication to first multi-port valve 300. Flow lines 221 and 222 connect second pump 204 in fluid flow communication to first multi-port valve 300. Additionally, first multi-port valve 300 is connected to a junction 230 via flow lines 232 and 234. Junction 230 is also connected to flow line 236, which places junction 230 in fluid flow communication with junction 240. Junction 240 is operably connected to probe 244, which can obtain samples from sample rack 246 or can be placed in fluid flow communication with wash station 270. Additionally, junction 240 is in fluid flow communication with second multi-port valve 500 via flow line 242. Thus, fluid flow across junction 240 is either between probe 244 and second multi-port valve 500 via flow line 242 or between probe 244 and junction 230 via flow line 236, depending on the pump 202, 204 in operation and its associated distribution valve setting. In turn, fluid flow across junction 230 is between probe 244 and first multi-port valve 300 either by flow line 232 or by flow line 234, depending on the pump 202, 204 in operation and its associated distribution valve setting. Accordingly, first multi-port valve 300 can receive fluid, typically samples, from probe 244 either through flow line 232 or through flow line 234. Additionally, probe 244 can receive fluid, typically buffer solution, from first multi-port valve 300 through either flow line 232 or through flow line 234. Finally, first multi-port valve 300 is in fluid flow communication with flow cell 104 via line 248, which places it in communication with waste selector 260.

Flow line 213 connects first pump 202 in fluid flow communication with junction 254, which is in fluid flow communication with second multi-port valve 500 via flow line 256. Similarly, flow line 223 connects second pump 202 in fluid flow communication with junction 254; hence, to second multi-port valve 500 via flow line 256. Thus, fluid flow across junction 254 is either between first pump 202 and second multi-port valve 500 via flow lines 213 and 256 or is between second pump 204 and second multi-port valve 500 via flow lines 223 and 256, or both pumps 202, 204 depending on which pump(s) is in operation and its associated valve setting.

As mentioned above, second multi-port valve 500 can be in fluid flow communication with probe 244 via flow line 242. Additionally, second multi-port valve 500 is in fluid flow communication with first multi-port valve 300 via flow line 250 and with flow cell 104 via flow line 252. Flow line 250 can include dispersion loop 251. Fluids entering flow cell 104 through flow line 252 interact with the thin-film optical substrate of the optical interface assembly 106. It should be noted that fluids entering flow cell 104 through flow line 248 can also interact with the optical interface depending on the selection of the waste port.

Flow cell 104 is connected in fluid flow communication with waste selector 260 via flow lines 262, 264, 266 and 268. Hence, fluid entering through flow line 248 or flow line 252 is delivered to waste selector 260. Waste selector 260 is in turn in fluid flow communication with wash station 270 via flow line 272. Wash station 270 is also in fluid flow communication with waste storage 274 via flow line 276.

One skilled in the art will be familiar with the use of the SPR system described above. Accordingly, the remainder of this disclosure will focus on the novel methods for: determining the presence of an aggregate in a heterogeneous mixture of monomer and aggregate; determining the percentage of aggregate in a heterogeneous mixture of monomer and aggregate; and, estimating the number of monomers making up an aggregate component in heterogeneous mixture of monomer and aggregate. The foregoing description of an SPR system provides only one embodiment of a SPR system suitable for the practice of the following described methods. Another system suitable for practicing the following methods includes but is not limited to the system disclosed in U.S. Patent Application Publication No. 2013/0273564.

The practice of the methods disclosed herein does not require an initial calibration step. In one aspect, the methods disclosed herein provide the ability to determine the presence of an aggregate in a heterogeneous solution. As discussed above, the methods disclosed herein are applicable to the analysis of biomolecules (also referred to as "analyte") such as, but not limited to, proteins, DNA, peptides, carbohydrates, small molecule compounds and hormones. For the purposes of the following discussions, the term monomer will be used to refer to the non-aggregated form of the biomolecule and the term aggregate refers to a combination of two or more biomolecules. Additionally, the term "under Taylor Dispersion conditions" refers to the development of a dispersion and a subsequent bulk refractive index or binding response curve by passing at least substantially all of the Taylor Dispersion developed by the pulsed or sigmoidal injection of the sample through the SPR sensing region. As known to those skilled in the art, a Taylor Dispersion injection produces the dispersion by injecting the sample into a buffer within a flow line within the SPR system.

Figure 4:
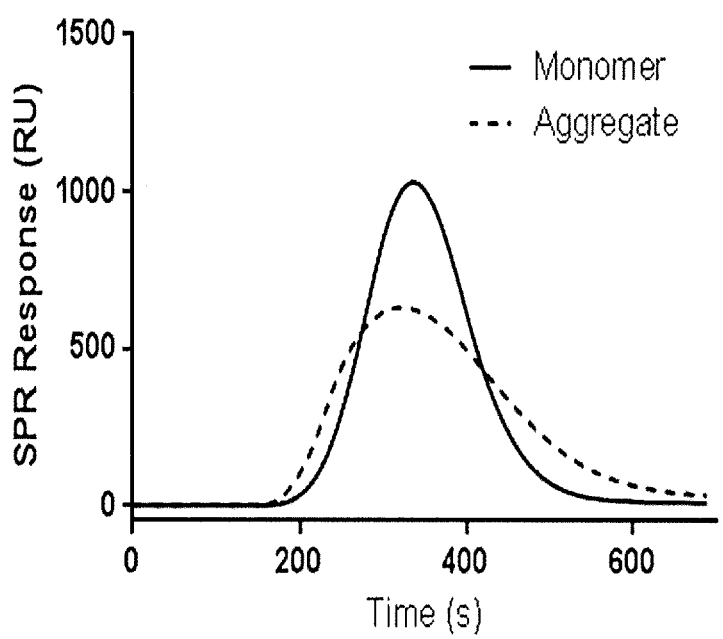
FIG. 4 depicts the SPR response curves for a homogenous solution of dextran monomer, i.e. 100% monomer and a homogenous solution of dextran aggregate, i.e. substantially 100% aggregate.

A qualitative method for determining the presence of an aggregate form of a monomer will be discussed with reference to the FIGS. Turning first to FIG. 4 a sample containing 40 kDa dextran as monomer was prepared and injected using a pulse technique to generate a Taylor Dispersion. The solid line reflects the SPR bulk refractive index response over time for this sample. To demonstrate the difference in SPR bulk refractive index response between a monomer sample and an aggregate sample, a solution containing 500 kDa dextran as aggregate. The dashed line reflects the SPR bulk refractive index response for the aggregate form.

Figure 5:
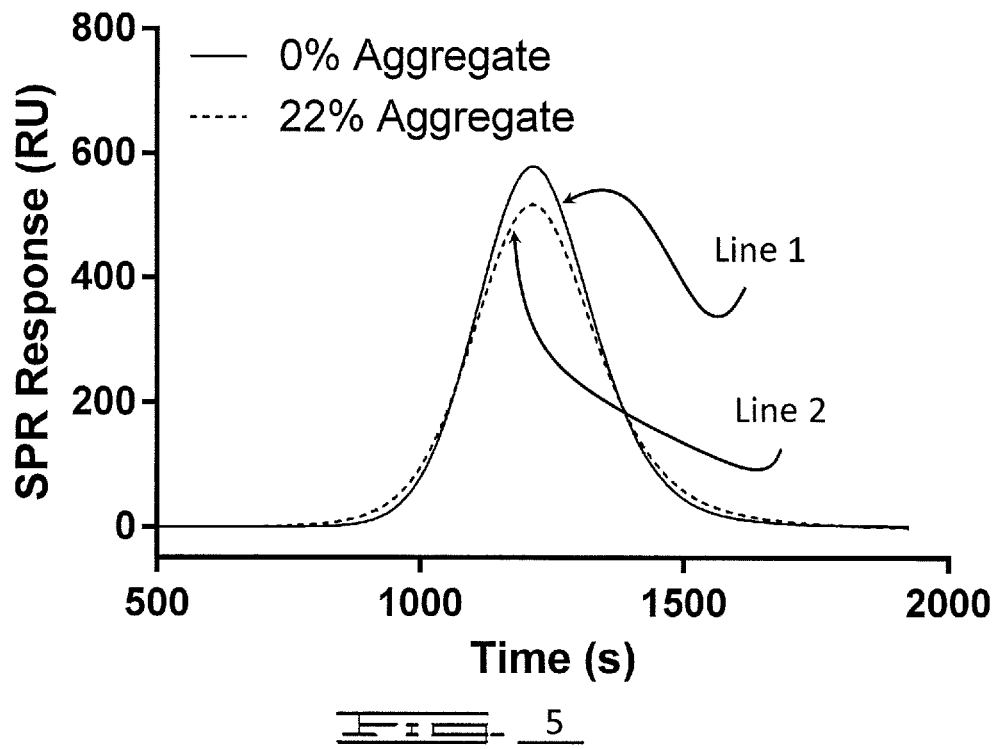
FIG. 5 depicts the SPR response curves for a homogeneous solution of dextran monomer, i.e. 100% monomer and a heterogeneous dextran solution of monomer and aggregate wherein the aggregate is 22% by weight.

FIG. 5 demonstrates the ability to distinguish between the SPR bulk refractive index curve of a solution containing substantially monomer and a solution containing 22% monomer by weight. In FIG. 5, line 1 represents the SPR bulk refractive index response for a sample of dextran monomer injected using a pulse type injection to generate the Taylor Dispersion. The sample had 20 mg/ml of dextran. Line 2 represents a heterogeneous solution containing dextran and dextran aggregate wherein the dextran aggregate was 22% by weight. Analysis of the curves indicates that the total area under each curve is substantially identical; therefore, analysis of only the heterogeneous curve in accordance with the methods discussed below will be beneficial for determining the approximate diffusion coefficient of the aggregate in the heterogeneous solution but also the percent aggregate in the heterogeneous solution.

Figure 6:
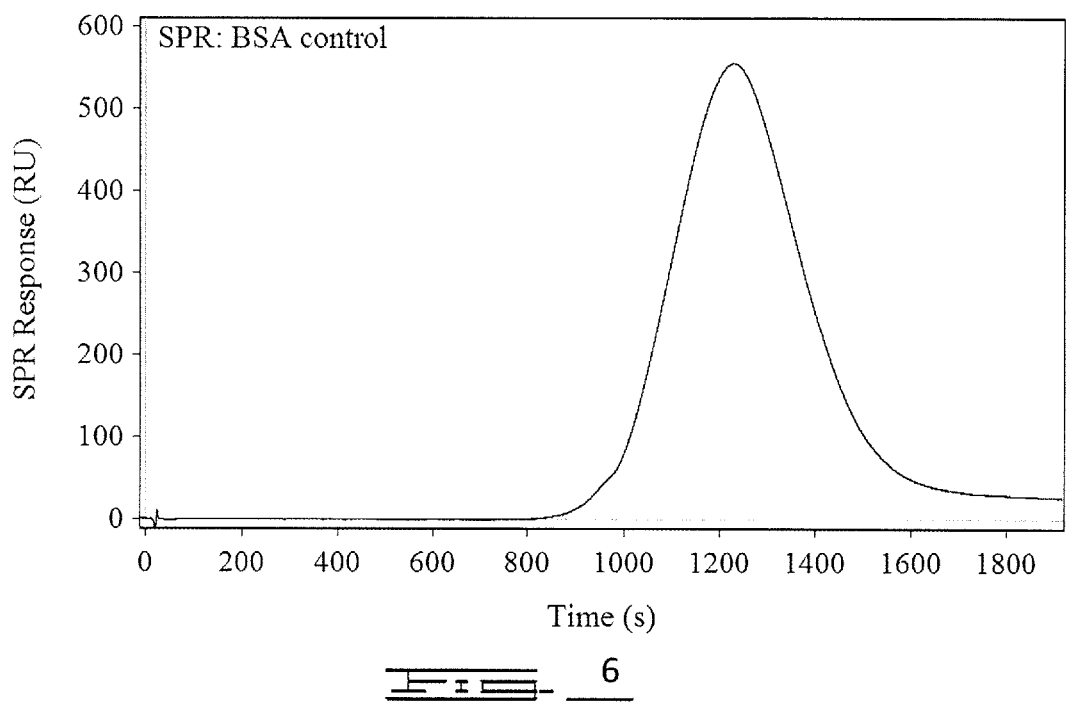
FIG. 6 depicts the SPR response curve for bovine serum albumin (BSA) with substantially no aggregate present in the solution.
Figure 7:
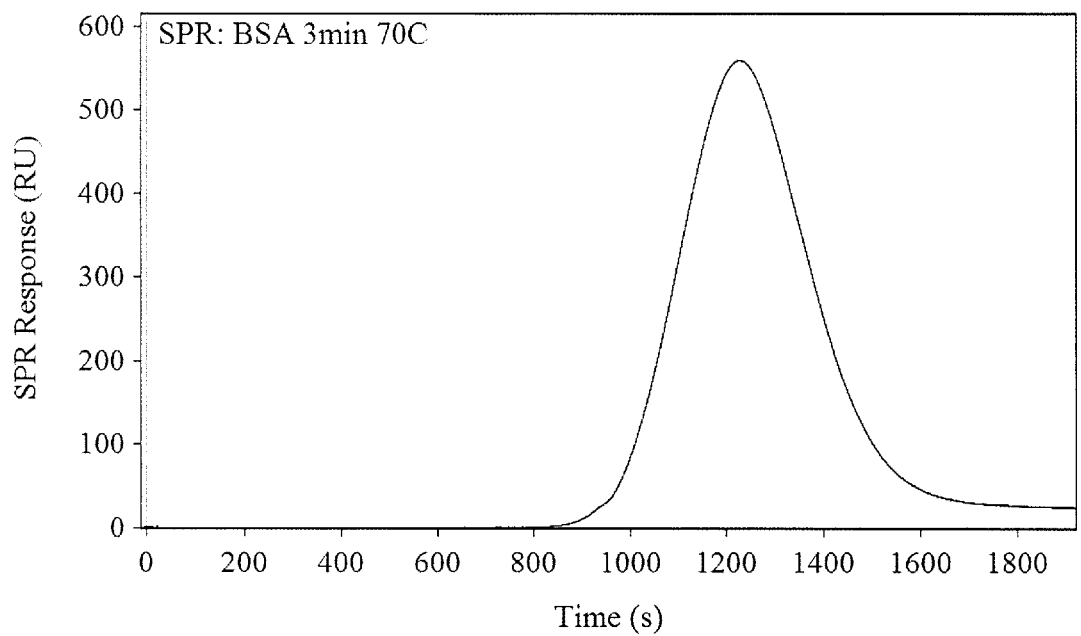
FIGS. 7-16 depict the SPR response curves for bovine serum albumin (BSA) after heating the BSA for a period of time to initiate aggregation of the BSA.
Figure 8:
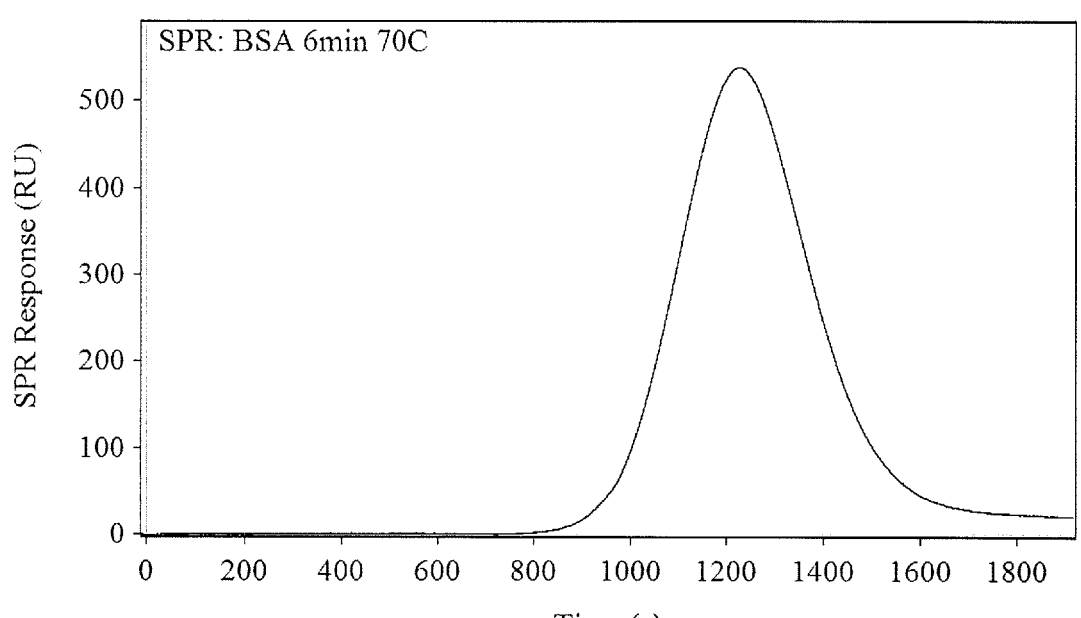
Figure 9:
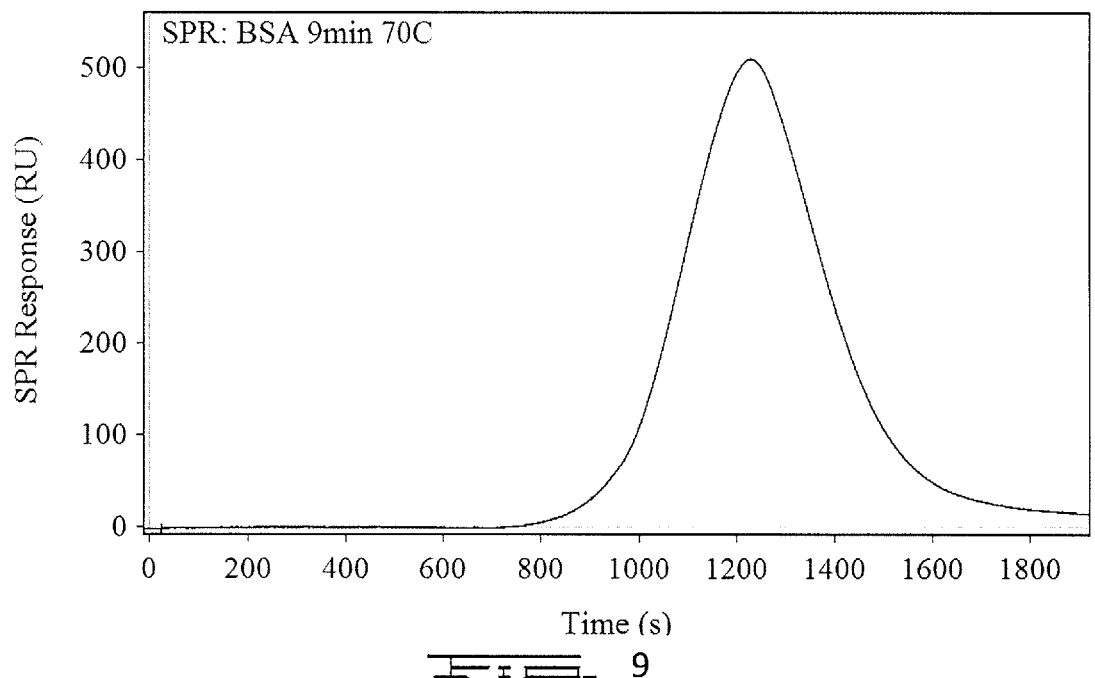
Figure 10:
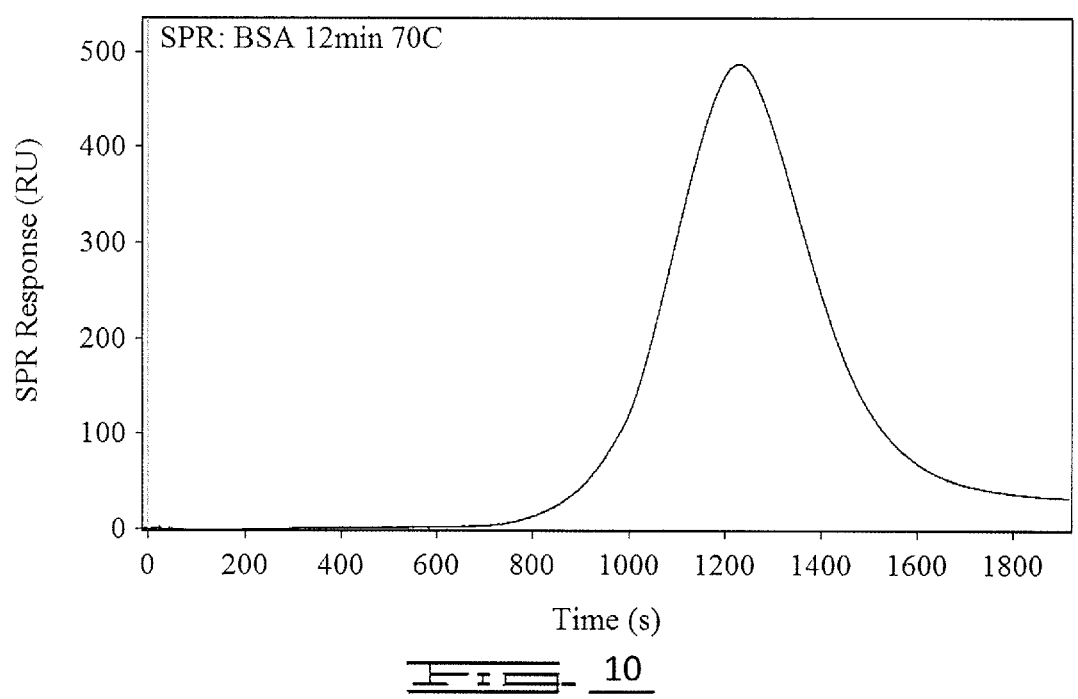
Figure 11:
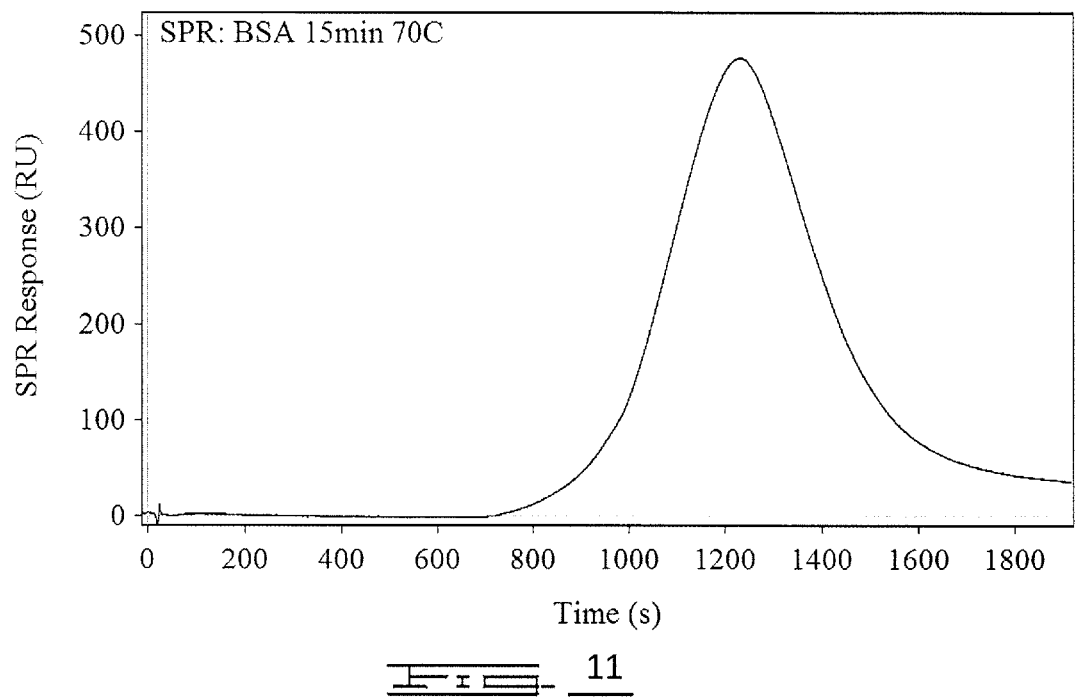
Figure 12:
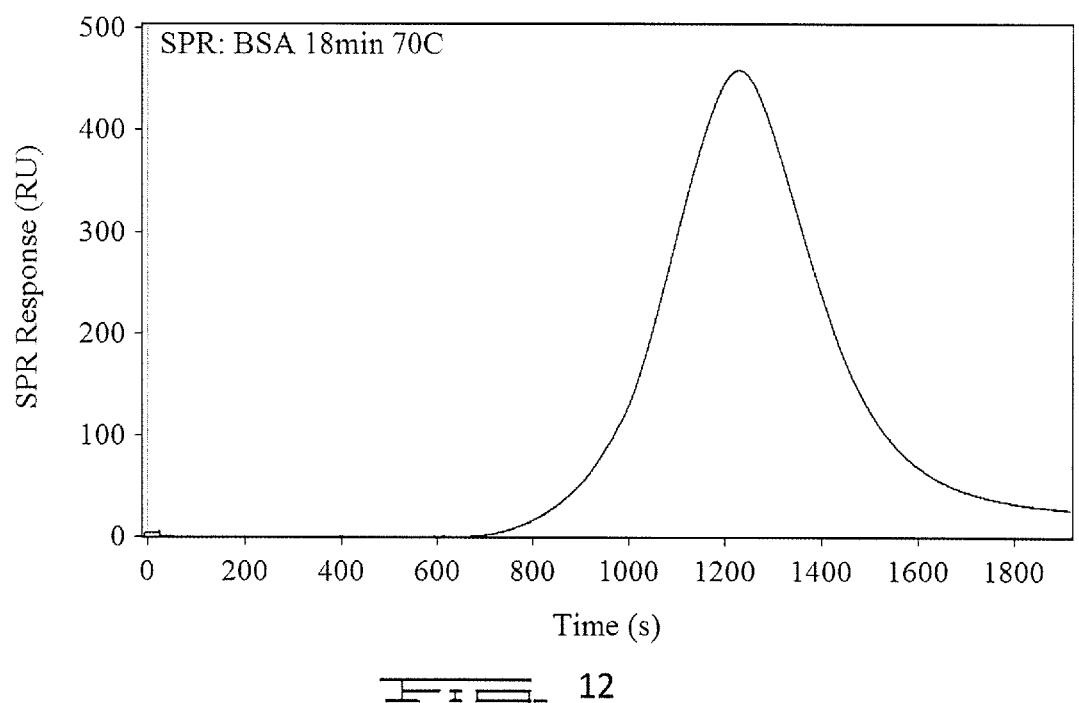
Figure 13:
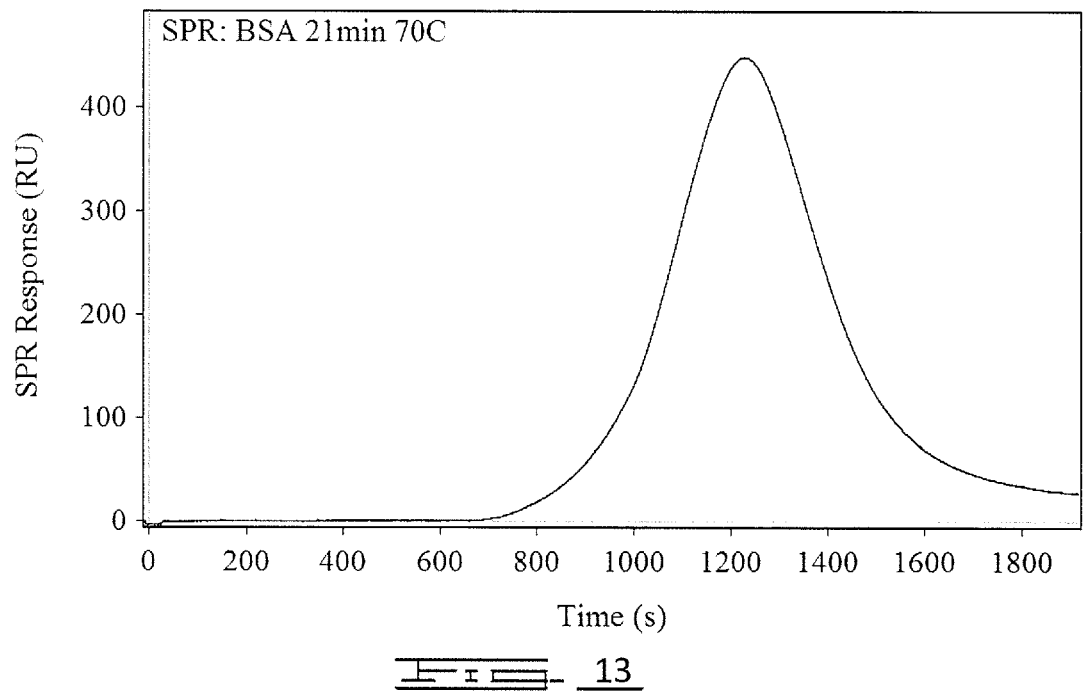
Figure 14:
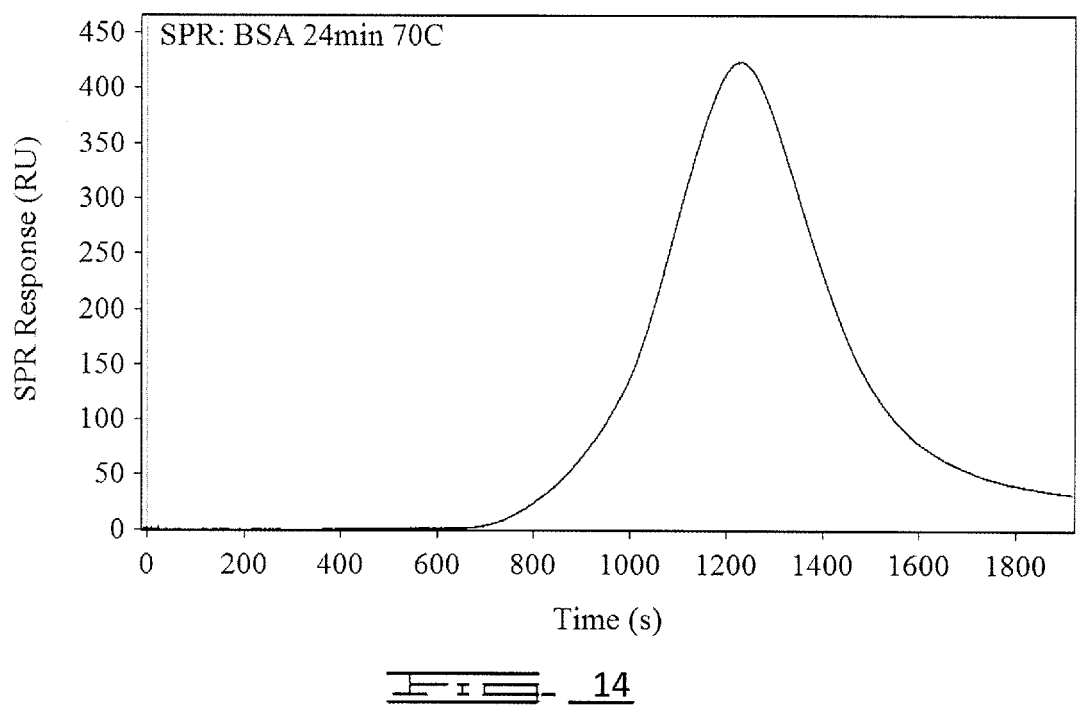
Figure 15:
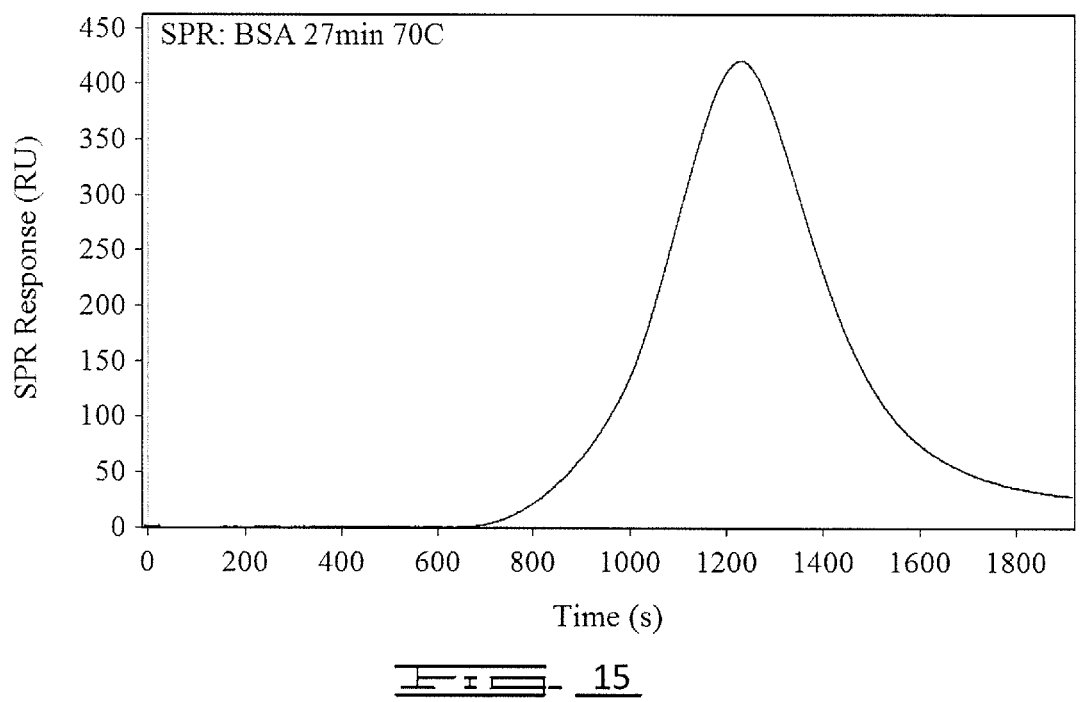
Figure 16:
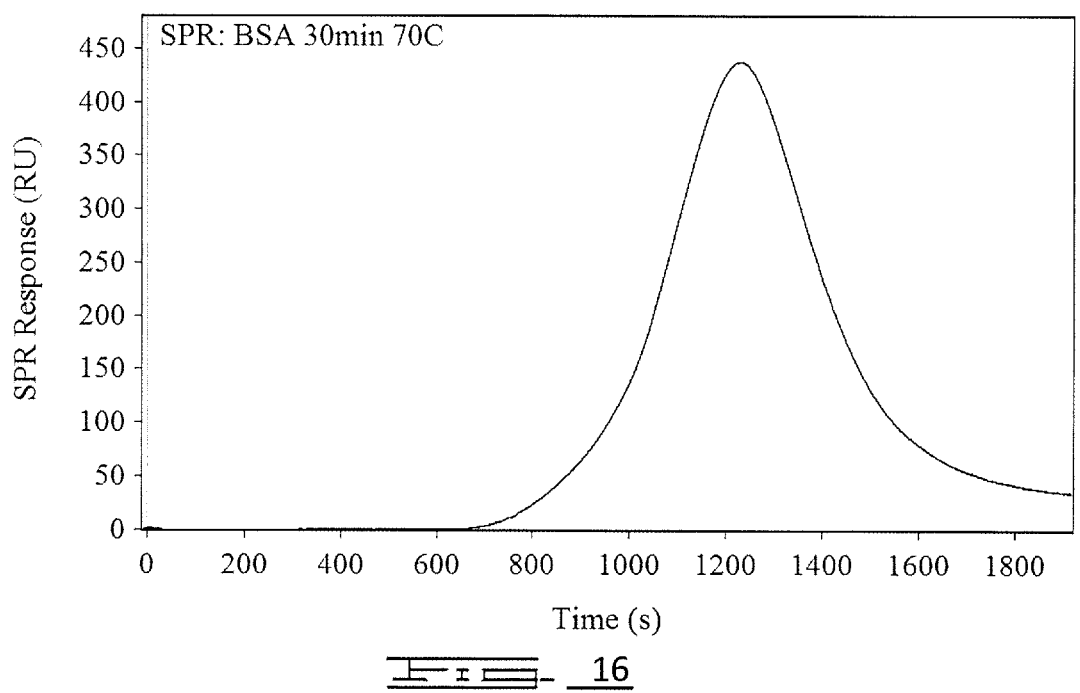

Likewise, FIGS. 6-16 depict the change in SPR bulk refractive index for bovine serum albumin (BSA) over time when the BSA has been exposed to heat. BSA is a serum albumin protein derived from cows commonly used as a protein concentration standard in lab experiments. When heated, BSA forms soluble aggregates. FIG. 6 depicts the SPR bulk refractive index for a Taylor Dispersion injection of BSA prior to undergoing any heating. Thus, the SPR bulk refractive index curve of FIG. 6 reflects a solution of BSA substantially free of aggregate. FIGS. 7-16 reflect the change in the SPR bulk refractive index curve as the BSA is exposed to a temperature of 70° C. for varying increasingly extended periods of time. Specifically, FIG. 7 reflects a heating period of 3 minutes and each subsequent FIG. increases the heating time by three minutes.

Having demonstrated that SPR refractive bulk index can distinguish between a homogeneous solution of monomer and a heterogeneous solution containing monomer and aggregate, the methods disclosed herein also provide for determining the diffusion coefficient of the aggregate as well as the concentration of the aggregate within in the heterogeneous solution.

The methods for determining aggregate concentration and diffusion coefficient work equally well with pulse type and sigmoidal type Taylor Dispersion injections. Typically, the solution used to prepare the Taylor Dispersion will have a combined concentration of monomer and aggregate of at least 0.05 mg/ml. However, the solution may have greater concentrations of monomer and aggregate up to and including a saturated solution. The methods disclosed herein may be practiced using monomers of any molecular weight; however, monomers with molecular weights greater than 10 kDa and aggregates based on such monomers will generally provide a more accurate Refractive Index Increment estimate (RII). As known to those skilled in the art, the Taylor Dispersion injection injects the indicated sample into a flow line leading to the SPR sensing region. Typically, the supply line will contain a buffer suitable for producing the Taylor Dispersion. Commonly used buffers include, but are not limited to, phosphate-buffered saline (PBS), HEPES-buffered solution, and Tris-buffered solution.

The following equations will be used when practicing a pulse type injection in the formation of the Taylor Dispersion.

$$Y = \frac{2 * C_m * dndc * V_i}{\pi^{3/2} * d^2 * \sqrt{k_m * t}} * e^{-\frac{0.25 * L^2 * (1 - \frac{t}{\tau})^2}{k_m * t}} + \quad \text{(Equation \#1a)}$$

$$\frac{2 * C_a * dndc * V_i}{\pi^{3/2} * d^2 * \sqrt{k_a * t}} * e^{-\frac{0.25 * L^2 * (1 - \frac{t}{\tau})^2}{k_a * t}}$$

where
$C_m$=monomer concentration
$C_a$=aggregate concentration
$C_{tot}$=total protein concentration ($C_m + C_a$)

$$C_m = C_{tot} - C_a \quad \text{(Equation \#1b)}$$

dndc=RII of the analyte (typically mL/mg*RU)
$V_i$=sample injection volume (m$^3$)
d=tubing diameter (m)
$\tau$=mean analyte residence time=L/u (s)
L=length of tube (m)
u=average velocity of fluid (m/s)
$k_m$=Taylor-Aris dispersion coefficient of the monomer species (m2/s)

$$k_m = \frac{u^2 * d^2}{192 * D_m} + D_m \quad \text{(Equation \#1c)}$$

$k_a$=Taylor-Aris dispersion coefficient of the aggregate species (m$^2$/s)

$$k_a = \frac{u^2 * d^2}{192 * D_a} + D_a \quad \text{(Equation \#1d)}$$

$D_m$=analyte diffusion coefficient of monomer species (m2/s)
$D_a$=analyte diffusion coefficient of aggregate species (m2/s)

When using a sigmoidal type injection to prepare the Taylor Dispersion, Equation #1a will be replaced with Equation #2a as provided below. The remaining defined terms and equations from the pulsed typed equations are the same.

$$Y = \frac{C_m * dndc}{2} * \left[1 - \operatorname{erf} \frac{1 - \frac{t}{\tau}}{2\sqrt{\frac{k_m}{uL} * \frac{t}{\tau}}}\right] + \quad \text{Equation \#2a}$$

$$\frac{C_a * dndc}{2} * \left[1 - \operatorname{erf} \frac{1 - \frac{t}{\tau}}{2\sqrt{\frac{k_a}{uL} * \frac{t}{\tau}}}\right]$$

where
erf=Gauss error function.

The above Equations #1a and #2a use the term dndc. The term dndc equals the refractive index increment (RII) for the given analyte. In most cases, the RII will be a known value for a given analyte. Additionally, the total concentration of monomer plus aggregate is a known value as determined by absorbance measurement or other suitable standard technique. Thus, the percent aggregate and percent monomer are the unknown values. Finally, in most instances the diffusion coefficient for a given analyte will be a known value. Thus, the methods disclosed herein measure Y as the sum of two Taylor dispersion events (monomer and aggregate) where the total analyte concentration (monomer plus aggregate) is known, the diffusion coefficient of the monomer is known, and the RII of the monomer is known.

Using a least squares fitting technique, the method fits either Equation #1a (pulse injection) or Equation #2a (sigmoidal injection) to the SPR bulk refractive index response curve produced by the Taylor Dispersion of the analyte solution to determine best-fit values for the unknowns in the equation.

According to one method, either equation #1a or #2a may be used to qualitatively determine the presence of aggregate in solution with monomer. This method begins with preparing a solution containing a monomer and identifying at least one monomer within the solution and determining the diffusion coefficient ($D_m$) of the monomer. Additionally, the method calls for determining the total analyte concentration ($C_{tot}$) in the solution where $C_{tot}$ includes both the monomer concentration ($C_m$) and any aggregate concentration ($C_a$) present in said solution. However, the individual values of $C_m$ and $C_a$ may be unknowns. Thereafter, SPR analysis to determine the bulk refractive index curve for a Taylor Dispersion of the analyte will be carried out. The sample used for the Taylor Dispersion analysis should have an analyte concentration (both monomer and aggregate) of at least 0.05 mg/ml. However, solutions up to saturated solutions will be acceptable. Following injection of the sample under Taylor Dispersion conditions, pulse or sigmoidal injections, a SPR bulk refractive index response curve is produced. Following generation of the SPR bulk refractive index response curve under Taylor Dispersion conditions, one uses a technique such as the least squares fitting technique to fit either equation #1a or #2a to the resulting SPR bulk refractive index response curve. As known to those skilled in the art, such fitting processes are capable of solving for more than one unknown through the use of an advanced iterative algorithms such as Levenberg-Marquardt. Additionally, on examination of equations #1a and #2a one will note that replacement of $C_m$ with $C_{tot}-C_a$ (equation #1b) eliminates one unknown ($C_m$) from the fitting process.

The Levenberg-Marquardt algorithm is well known to those skilled in the art. One way of expressing the Levenberg-Marquardt is as popular alternative to the Gauss-Newton method of finding the minimum of a function F C) that is a sum of squares of nonlinear functions, $$F(x) = \frac{1}{2}\sum_{i=1}^{m}[f_i(x)]^2.$$

Let the Jacobian of $f_i(x)$ be denoted $J_i(x)$, then the Levenberg-Marquardt method searches in the direction given by the solution P to the equations $$(J_k^T J_k + \lambda_k I)p_k = -J_k^T f_k,$$

where $\lambda_k$ are nonnegative scalars and I is the identity matrix.

When performing a qualitative analysis to determine the presence of an aggregate in solution, the fitting process provides an approximation of $C_a$ and allows one to solve for $D_a$. Since $D_m$ is a known value, one can then determine whether or not $D_a$ equals or does not equal $D_m$. If $D_a$ does not equal $D_m$, then the bulk refractive index reflects the presence of aggregate in solution. See for example FIG. 5.

In another method one can solve quantitatively for both the $D_a$ and the $C_a$ using the SPR bulk refractive index produced by SPR analysis and either equation #1a or #2a as appropriate for the type of Taylor Dispersion injection. This method begins with preparing a solution containing a monomer and identifying at least one monomer within the solution and determining the diffusion coefficient ($D_m$) of the monomer. Additionally, the method calls for determining the total analyte concentration ($C_{tot}$) in the solution where $C_{tot}$ includes both the monomer concentration ($C_m$) and any aggregate concentration ($C_a$) present in said solution. However, the individual values of $C_m$ and $C_a$ may be unknowns. Thereafter, SPR analysis to determine the bulk refractive index curve for a Taylor Dispersion of the analyte will be carried out. The sample used for the Taylor Dispersion analysis should have an analyte concentration (both monomer and aggregate) of at least 0.05 mg/ml in order for a bulk refractive index signal to be detected. However, solutions up to saturated solutions will be acceptable. Following injection of the sample under Taylor Dispersion conditions, pulse or sigmoidal injections, a SPR bulk refractive index response curve is produced. Following generation of the SPR bulk refractive index response curve under Taylor Dispersion conditions, one uses a technique such as the least squares fitting technique to fit either equation #1a or #2a to the resulting SPR bulk refractive index response curve to solve for $D_a$ and $C_a$.

Through the use of the least squares fitting technique, equation #1a or #2a, as determined by the type of injection method, is fitted to the resulting SPR bulk refractive index curve. Upon reaching the preferred fit of equation #1a or #2a, to the SPR bulk refractive index curve one can determine $D_a$ and $C_a$ for the aggregate in the heterogeneous solution.

Figure 17:
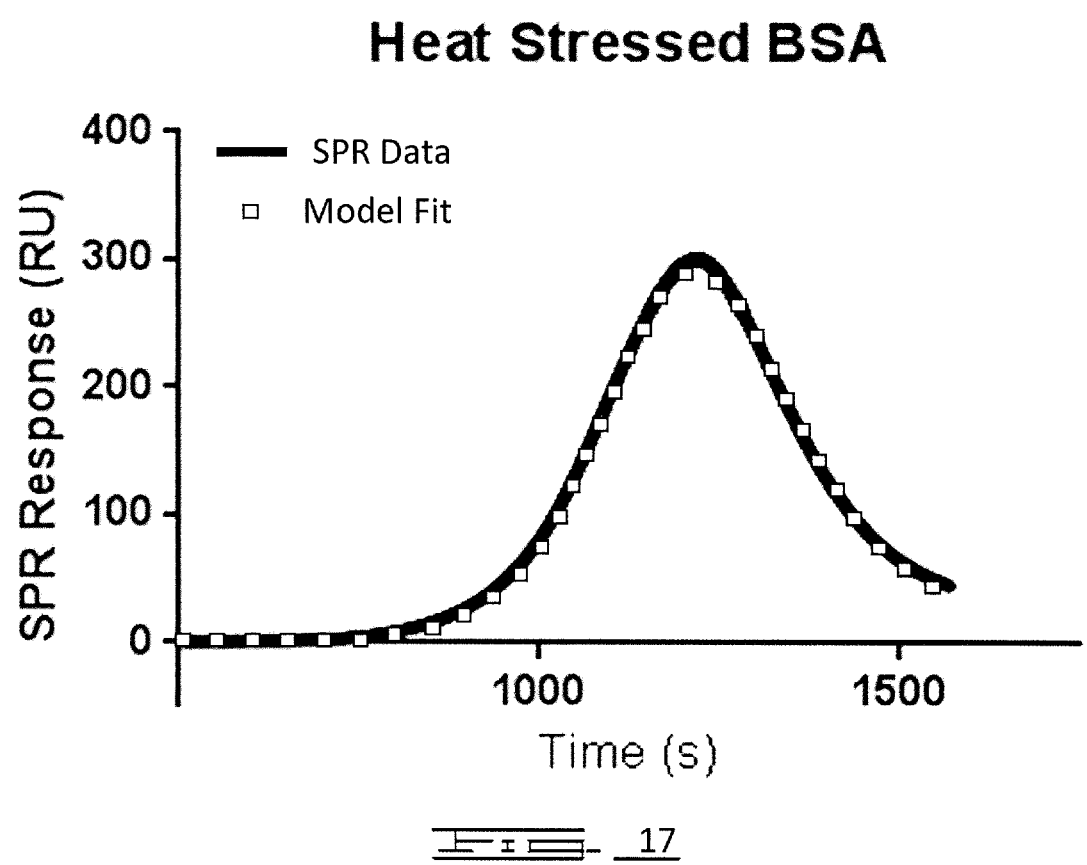
FIG. 17 depicts the fitting of Equation #1a to the SPR bulk refractive index curve of heat stressed BSA.

FIG. 17 provides an example of the method for quantitatively determining $D_m$ and $C_a$. The SPR bulk refractive index curve was prepared using an injection of BSA heated for 20 minutes at 66° C. A sample containing 10 mg/ml of the heat treated BSA was injected under pulse conditions to generate a Taylor Dispersion to produce the depicted SPR the bulk refractive index curve. Subsequently, Equation #1a was fitted using least squares fitting technique to the SPR data. As depicted in FIG. 17, the fitting process results in a curve substantially equal to the SPR bulk refractive index curve. $D_a$ and $C_a$ were calculated by fitting of Equation #1a to the SPR the bulk refractive index curve and using the following known values in the fitting process: $D_m$=6.03× $10^{-11}$ m$^2$/s; dndc, i.e. RII 185 ml/mg*RU; and, $C_{tot}$=10 mg/ml. As a result, $D_a$ was calculated to be 1.776×$10^{-11}$ m$^2$/s and $C_a$ was calculated to be 4.55 mg/ml or 45.5% of the sample solution. In addition to demonstrating the ability to determine $D_a$ and $C_a$, the difference between $D_a$ and $D_m$, demonstrates the ability to determine the presence of aggregate within a heterogeneous solution without the need for prior calibration.

Other embodiments of the present invention will be apparent to one skilled in the art. As such, the foregoing description merely enables and describes the general uses and methods of the present invention. Accordingly, the following claims define the true scope of the present invention.

The invention claimed is:

1. A method for determining the presence of an aggregate form of an analyte in a heterogeneous solution comprising:
   identifying at least one monomer of the analyte within said solution and determining a diffusion coefficient ($D_m$) for said monomer;
   determining a total analyte concentration ($C_{tot}$) within said solution, said total analyte concentration including both the monomer concentration ($C_m$) and any aggregate concentration ($C_a$) present in said solution;
   performing SPR analysis on a sample of said solution containing said monomer and aggregate by injecting said sample under Taylor Dispersion conditions using a pulse injection technique;
   determining the SPR bulk refractive index response curve under Taylor Dispersion conditions;
   using a least squares fitting technique, fit Equation #1a to the SPR bulk refractive index response curve for said sample:

$$Y = \frac{2*C_m*dndc*Vi}{\pi^{3/2}*d^2*\sqrt{k_m*t}}*e^{\frac{-0.25*L^2*\left(1-\frac{t}{\tau}\right)^2}{k_m*t}} + \frac{2*C_a*dndc*Vi}{\pi^{3/2}*d^2*\sqrt{k_a*t}}*e^{\frac{-0.25*L^2*\left(1-\frac{t}{\tau}\right)^2}{k_a*t}} \quad \text{(Equation \#1a)}$$

where
   dndc=Refractive Index Increment estimate (RII) of the analyte (typically mL/mg*RU)
   $V_j$=sample injection volume (m$^3$)
   d=tubing diameter (m)
   τ=mean analyte residence time=L/u (s)
   L=length of tube (m)
   u=average velocity of fluid (m/s)
   $k_m$=Taylor-Aris dispersion coefficient of the monomer species (m$^2$/s)
   $k_a$=Taylor-Aris dispersion coefficient of the aggregate species (m$^2$/s)

$D_a$=analyte diffusion coefficient of aggregate species (m2/s)

after fitting Equation #1a to the bulk refractive index response curve, thereby providing an approximate $C_a$, solving for $D_a$, wherein when $D_a$ does not equal $D_m$ provides a positive determination of the presence of an aggregate form of the analyte in said heterogeneous solution.

2. The method of claim 1, further comprising the step of using a ratio of $D_m$ to $D_a$ to estimate the number of monomers within said aggregate wherein $D_m$ divided by $D_a$ equals the average number of monomers in the aggregate form found in said sample.

3. A method for determining the concentration of an aggregate form of an analyte in a heterogeneous solution comprising:

identifying at least one monomer of the analyte within said solution and determining a diffusion coefficient ($D_m$) for said monomer;

determining a total analyte concentration ($C_{tot}$) within said solution, said total analyte concentration including both the monomer concentration ($C_m$) and any aggregate concentration ($C_a$) present in said solution;

performing SPR analysis on a sample of said solution containing said monomer and aggregate by injecting said sample under Taylor Dispersion conditions using a pulse injection technique;

determining the SPR bulk refractive index response curve under Taylor Dispersion conditions;

using a least squares fitting technique, fit Equation #1a to the SPR bulk refractive index response curve for said sample:

$$Y = \frac{2*C_m*dndc*Vi}{\pi^{3/2}*d^2*\sqrt{k_m*t}}*e^{\frac{-0.25*L^2*\left(1-\frac{t}{\tau}\right)^2}{k_m*t}} + \frac{2*C_a*dndc*Vi}{\pi^{3/2}*d^2*\sqrt{k_a*t}}*e^{\frac{-0.25*L^2*\left(1-\frac{t}{\tau}\right)^2}{k_a*t}}$$ (Equation #1a)

where
dndc=Refractive Index Increment estimate (RII) of the analyte (typically mL/mg*RU)
$V_j$=sample injection volume (m$^3$)
d=tubing diameter (m)
$\tau$=mean analyte residence time=L/u (s)
L=length of tube (m)
u=average velocity of fluid (m/s)
$k_m$=Taylor-Aris dispersion coefficient of the monomer species (m$^2$/s)
$k_a$=Taylor-Aris dispersion coefficient of the aggregate species (m$^2$/s)
$D_a$=analyte diffusion coefficient of aggregate species (m2/s)

after fitting Equation #1a to the bulk refractive index response curve, calculating the $D_a$ and $C_a$ for said aggregate within said sample.

4. The method of claim 3, further comprising the step of using a ratio of $D_m$ to $D_a$ to estimate the number of monomers within said aggregate wherein $D_m$ divided by $D_a$ equals the average number of monomers in the aggregate form found in said sample.

5. A method for determining the presence of an aggregate form of an analyte in a heterogeneous solution comprising:

identifying at least one monomer of the analyte within said solution and determining a diffusion coefficient ($D_m$) for said monomer;

determining a total analyte concentration ($C_{tot}$) within said solution, said total analyte concentration including both the monomer concentration ($C_m$) and any aggregate concentration ($C_a$) present in said solution;

performing SPR analysis on a sample of said solution, said sample having a combined concentration of said monomer and aggregate of at least 0.05 mg/ml, by injecting said sample under Taylor Dispersion conditions using a pulse injection technique;

determining the SPR bulk refractive index response curve under Taylor Dispersion conditions;

using a least squares fitting technique, fit Equation #1a to the SPR bulk refractive index response curve for said sample:

$$Y = \frac{2*C_m*dndc*Vi}{\pi^{3/2}*d^2*\sqrt{k_m*t}}*e^{\frac{-0.25*L^2*\left(1-\frac{t}{\tau}\right)^2}{k_m*t}} + \frac{2*C_a*dndc*Vi}{\pi^{3/2}*d^2*\sqrt{k_a*t}}*e^{\frac{-0.25*L^2*\left(1-\frac{t}{\tau}\right)^2}{k_a*t}}$$ (Equation #1a)

where
dndc=Refractive Index Increment estimate (RII) of the analyte (typically mL/mg*RU)
$V_j$=sample injection volume (m$^3$)
d=tubing diameter (m)
$\tau$=mean analyte residence time=L/u (s)
L=length of tube (m)
u=average velocity of fluid (m/s)
$k_m$=Taylor-Aris dispersion coefficient of the monomer species (m$^2$/s)
$k_a$=Taylor-Aris dispersion coefficient of the aggregate species (m2/s)
$D_a$=analyte diffusion coefficient of aggregate species (m2/s)

after fitting Equation #1a to the bulk refractive index response curve, thereby providing an approximate $C_a$, solving for $D_a$, wherein when $D_a$ does not equal $D_m$ provides a positive determination of the presence of an aggregate form of the analyte in said heterogeneous solution.

6. The method of claim 5, further comprising the step of using a ratio of $D_m$ to $D_a$ to estimate the number of monomers within said aggregate wherein $D_m$ divided by $D_a$ equals the average number of monomers in the aggregate form found in said sample.

7. A method for determining the concentration of an aggregate form of an analyte in a heterogeneous solution comprising:

identifying at least one monomer of the analyte within said solution and determining a diffusion coefficient ($D_m$) for said monomer;

determining a total analyte concentration ($C_{tot}$) within said solution, said total analyte concentration including both the monomer concentration ($C_m$) and any aggregate concentration ($C_a$) present in said solution;

performing SPR analysis on a sample of said solution, said sample having a combined concentration of said monomer and aggregate of at least 0.05 mg/ml, by injecting said sample under Taylor Dispersion conditions using a pulse injection technique;

determining the SPR bulk refractive index response curve under Taylor Dispersion conditions;

using a least squares fitting technique, fit Equation #1a to the SPR bulk refractive index response curve for said sample:

$$Y = \frac{2*C_m*dndc*V_i}{\pi^{3/2}*d^2*\sqrt{k_m*t}}*e^{\frac{-0.25*L^2*\left(1-\frac{t}{\tau}\right)^2}{k_m*t}} + \frac{2*C_a*dndc*V_i}{\pi^{3/2}*d^2*\sqrt{k_a*t}}*e^{\frac{-0.25*L^2*\left(1-\frac{t}{\tau}\right)^2}{k_a*t}}$$ (Equation #1a)

where
dndc=Refractive Index Increment estimate (RII) of the analyte (typically mL/mg*RU)
$V_j$=sample injection volume (m$^3$)
d=tubing diameter (m)
τ=mean analyte residence time=L/u (s)
L=length of tube (m)
u=average velocity of fluid (m/s)
$k_m$=Taylor-Aris dispersion coefficient of the monomer species (m$^2$/s)
$k_a$=Taylor-Aris dispersion coefficient of the aggregate species (m$^2$/s)
$D_a$=analyte diffusion coefficient of aggregate species (m2/s)
after fitting Equation #1a to the bulk refractive index response curve, calculating the $D_a$ and $C_a$ for said aggregate within said sample.

8. The method of claim 7, further comprising the step of using a ratio of $D_m$ to $D_a$ to estimate the number of monomers within said aggregate wherein $D_m$ divided by $D_a$ equals the average number of monomers in the aggregate form found in said sample.

9. A method for determining the presence of an aggregate form of an analyte in a heterogeneous solution comprising:
identifying at least one monomer of the analyte within said solution and determining a diffusion coefficient ($D_m$) for said monomer;
determining a total analyte concentration ($C_{tot}$) within said solution, said total analyte concentration including both the monomer concentration ($C_m$) and any aggregate concentration ($C_a$) present in said solution;
performing SPR analysis on a sample of said solution containing said monomer and aggregate by injecting said sample under Taylor Dispersion conditions using a sigmoid injection technique;
determining the SPR bulk refractive index response curve under Taylor Dispersion conditions;
using a least squares fitting technique, fit Equation #2a to the SPR bulk refractive index response curve for said sample:

$$Y = \frac{C_m*dndc}{2}*\left[1-\text{erf}\frac{1-\frac{t}{\tau}}{2\sqrt{\frac{k_m}{uL}*\frac{t}{\tau}}}\right] + \frac{C_a*dndc}{2}*\left[1-\text{erf}\frac{1-\frac{t}{\tau}}{2\sqrt{\frac{k_a}{uL}*\frac{t}{\tau}}}\right]$$ (Equation #2a)

where
dndc=RII Refractive Index Increment estimate (RII) of the analyte (typically mL/mg*RU)
erf=Gauss error function
d=tubing diameter (m)
τ=mean analyte residence time=L/u (s)
L=length of tube (m)
u=average velocity of fluid (m/s)
$k_m$=Taylor-Aris dispersion coefficient of the monomer species (m$^2$/s)
$k_a$=Taylor-Aris dispersion coefficient of the aggregate species (m$^2$/s)
$D_a$=analyte diffusion coefficient of aggregate species (m2/s)
after fitting Equation #1a to the bulk refractive index response curve, thereby providing an approximate $C_a$, solving for $D_a$, wherein when $D_a$ does not equal $D_m$ provides a positive determination of the presence of an aggregate form of the analyte in said heterogeneous solution.

10. The method of claim 9, further comprising the step of using a ratio of $D_m$ to $D_a$ to estimate the number of monomers within said aggregate wherein $D_m$ divided by $D_a$ equals the average number of monomers in the aggregate form found in said sample.

11. A method for determining the presence of an aggregate form of an analyte in a heterogeneous solution comprising:
identifying at least one monomer of the analyte within said solution and determining a diffusion coefficient ($D_m$) for said monomer;
determining a total analyte concentration ($C_{tot}$) within said solution, said total analyte concentration including both the monomer concentration ($C_m$) and any aggregate concentration ($C_a$) present in said solution;
performing SPR analysis on a sample of said solution containing said monomer and aggregate by injecting said sample under Taylor Dispersion conditions using a sigmoid injection technique;
determining the SPR bulk refractive index response curve under Taylor Dispersion conditions;
using a least squares fitting technique, fit Equation #1a to the SPR bulk refractive index response curve for said sample:

$$Y = \frac{C_m*dndc}{2}*\left[1-\text{erf}\frac{1-\frac{t}{\tau}}{2\sqrt{\frac{k_m}{uL}*\frac{t}{\tau}}}\right] + \frac{C_a*dndc}{2}*\left[1-\text{erf}\frac{1-\frac{t}{\tau}}{2\sqrt{\frac{k_a}{uL}*\frac{t}{\tau}}}\right]$$ (Equation #1a)

where
dndc=Refractive Index Increment estimate (RII) of the analyte (typically mL/mg*RU)
erf=Gauss error function
d=tubing diameter (m)
τ=mean analyte residence time=L/u (s)
L=length of tube (m)
u=average velocity of fluid (m/s)
$k_m$=Taylor-Aris dispersion coefficient of the monomer species (m$^2$/s)

$k_a$=Taylor-Aris dispersion coefficient of the aggregate species (m²/s)

$D_a$=analyte diffusion coefficient of aggregate species (m2/s)

after fitting Equation #1a to the bulk refractive index response curve, calculating the $D_a$ and $C_a$ for said aggregate within said sample.

12. The method of claim 11, further comprising the step of using a ratio of $D_m$ to $D_a$ to estimate the number of monomers within said aggregate wherein $D_m$ divided by $D_a$ equals the average number of monomers in the aggregate form found in said sample.

13. A method for determining the presence of an aggregate form of an analyte in a heterogeneous solution comprising:

identifying at least one monomer of the analyte within said solution and determining a diffusion coefficient ($D_m$) for said monomer;

determining a total analyte concentration ($C_{tot}$) within said solution, said total analyte concentration including both the monomer concentration ($C_m$) and any aggregate concentration ($C_a$) present in said solution;

performing SPR analysis on a sample of said solution, said sample having a combined concentration of said monomer and aggregate of at least 0.05 mg/ml, by injecting said sample under Taylor Dispersion conditions using a sigmoid injection technique;

determining the SPR bulk refractive index response curve under Taylor Dispersion conditions;

using a least squares fitting technique, fit Equation #1a to the SPR bulk refractive index response curve for said sample:

$$Y = \frac{C_m * dndc}{2} * \left[1 - \text{erf}\frac{1 - \frac{t}{\tau}}{2\sqrt{\frac{k_m}{uL} * \frac{t}{\tau}}}\right] + \quad \text{(Equation \#1a)}$$

$$\frac{C_a * dndc}{2} * \left[1 - \text{erf}\frac{1 - \frac{t}{\tau}}{2\sqrt{\frac{k_a}{uL} * \frac{t}{\tau}}}\right]$$

where dndc=Refractive Index Increment estimate (RII) of the analyte (typically mL/mg*RU)

erf=Gauss error function d=tubing diameter (m)

τ=mean analyte residence time=L/u (s)

L=length of tube (m)

u=average velocity of fluid (m/s)

$k_m$=Taylor-Aris dispersion coefficient of the monomer species (m²/s)

$k_a$=Taylor-Aris dispersion coefficient of the aggregate species (m²/s)

$D_a$=analyte diffusion coefficient of aggregate species (m2/s)

after fitting Equation #1a to the bulk refractive index response curve, thereby providing an approximate $C_a$, solving for $D_a$, wherein when $D_a$ does not equal $D_m$ provides a positive determination of the presence of an aggregate form of the analyte in said heterogeneous solution.

14. The method of claim 13, further comprising the step of using a ratio of $D_m$ to $D_a$ to estimate the number of monomers within said aggregate wherein $D_m$ divided by $D_a$ equals the average number of monomers in the aggregate form found in said sample.

15. A method for determining the presence of an aggregate form of an analyte in a heterogeneous solution comprising:

identifying at least one monomer of the analyte within said solution and determining a diffusion coefficient ($D_m$) for said monomer;

determining a total analyte concentration ($C_{tot}$) within said solution, said total analyte concentration including both the monomer concentration ($C_m$) and any aggregate concentration ($C_a$) present in said solution;

performing SPR analysis on a sample of said solution, said sample having a combined concentration of said monomer and aggregate of at least 0.05 mg/ml, by injecting said sample under Taylor Dispersion conditions using a sigmoid injection technique;

determining the SPR bulk refractive index response curve under Taylor Dispersion conditions;

using a least squares fitting technique, fit Equation #1a to the SPR bulk refractive index response curve for said sample:

$$Y = \frac{C_m * dndc}{2} * \left[1 - \text{erf}\frac{1 - \frac{t}{\tau}}{2\sqrt{\frac{k_m}{uL} * \frac{t}{\tau}}}\right] + \quad \text{(Equation \#1a)}$$

$$\frac{C_a * dndc}{2} * \left[1 - \text{erf}\frac{1 - \frac{t}{\tau}}{2\sqrt{\frac{k_a}{uL} * \frac{t}{\tau}}}\right]$$

where dndc=Refractive Index Increment estimate (RII) of the analyte (typically mL/mg*RU)

erf=Gauss error function d=tubing diameter (m)

τ=mean analyte residence time=L/u (s)

L=length of tube (m)

u=average velocity of fluid (m/s)

$k_m$=Taylor-Aris dispersion coefficient of the monomer species (m²/s)

$k_a$=Taylor-Aris dispersion coefficient of the aggregate species (m²/s)

$D_a$=analyte diffusion coefficient of aggregate species (m2/s)

after fitting Equation #1a to the bulk refractive index response curve, calculating the $D_a$ and $C_a$ for said aggregate within said sample.

16. The method of claim 15, further comprising the step of using a ratio of $D_m$ to $D_a$ to estimate the number of monomers within said aggregate wherein $D_m$ divided by $D_a$ equals the average number of monomers in the aggregate form found in said sample.

* * * * *